Dec. 13, 1932.   D. H. DAVIS   1,890,972
JACK FOR SEMITRAILERS
Filed Feb. 15, 1932   2 Sheets-Sheet 2
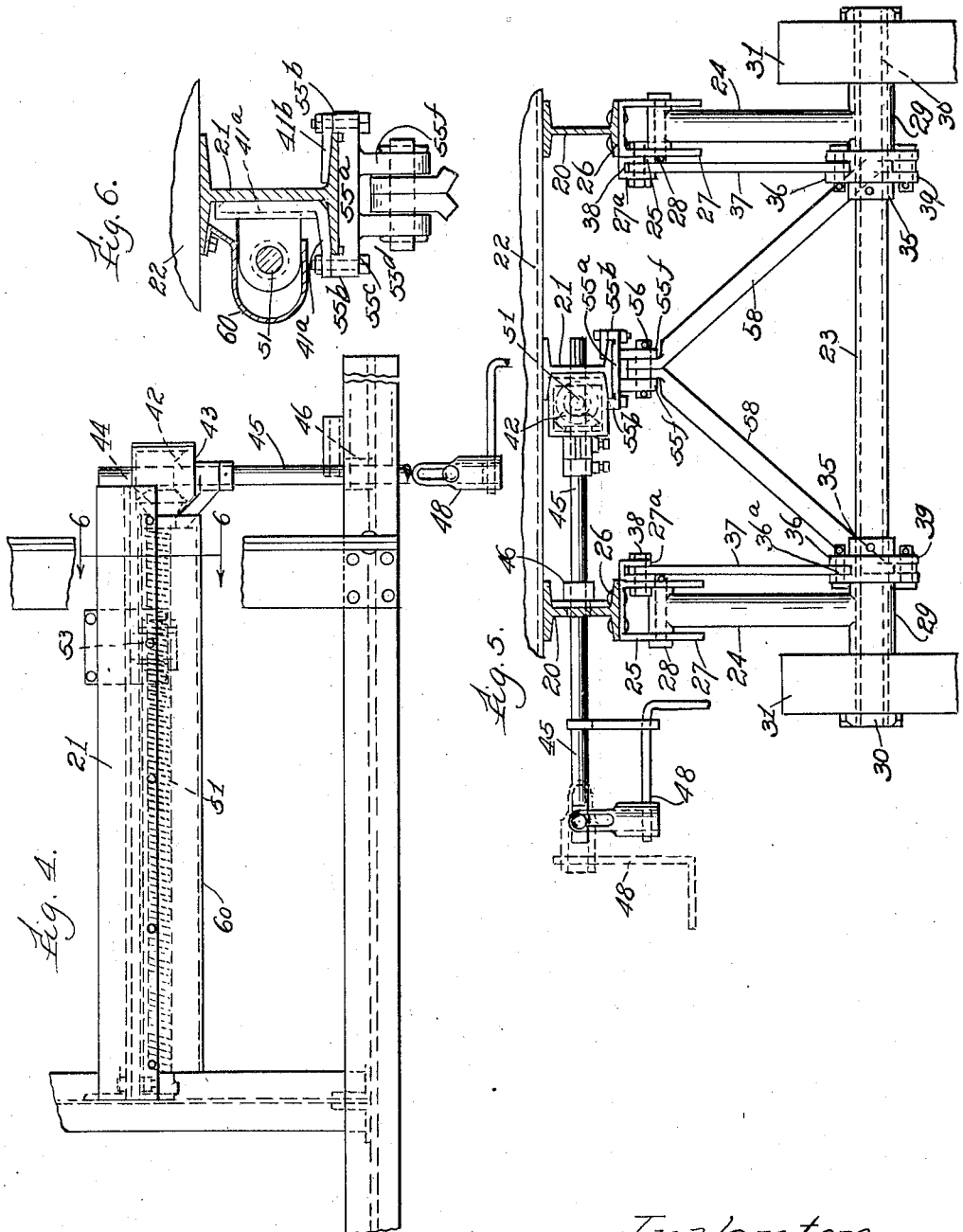
Inventor:
Durrel H. Davis.
by Burton Burton
his Attorneys.
Witness.
H. O. McKnight.

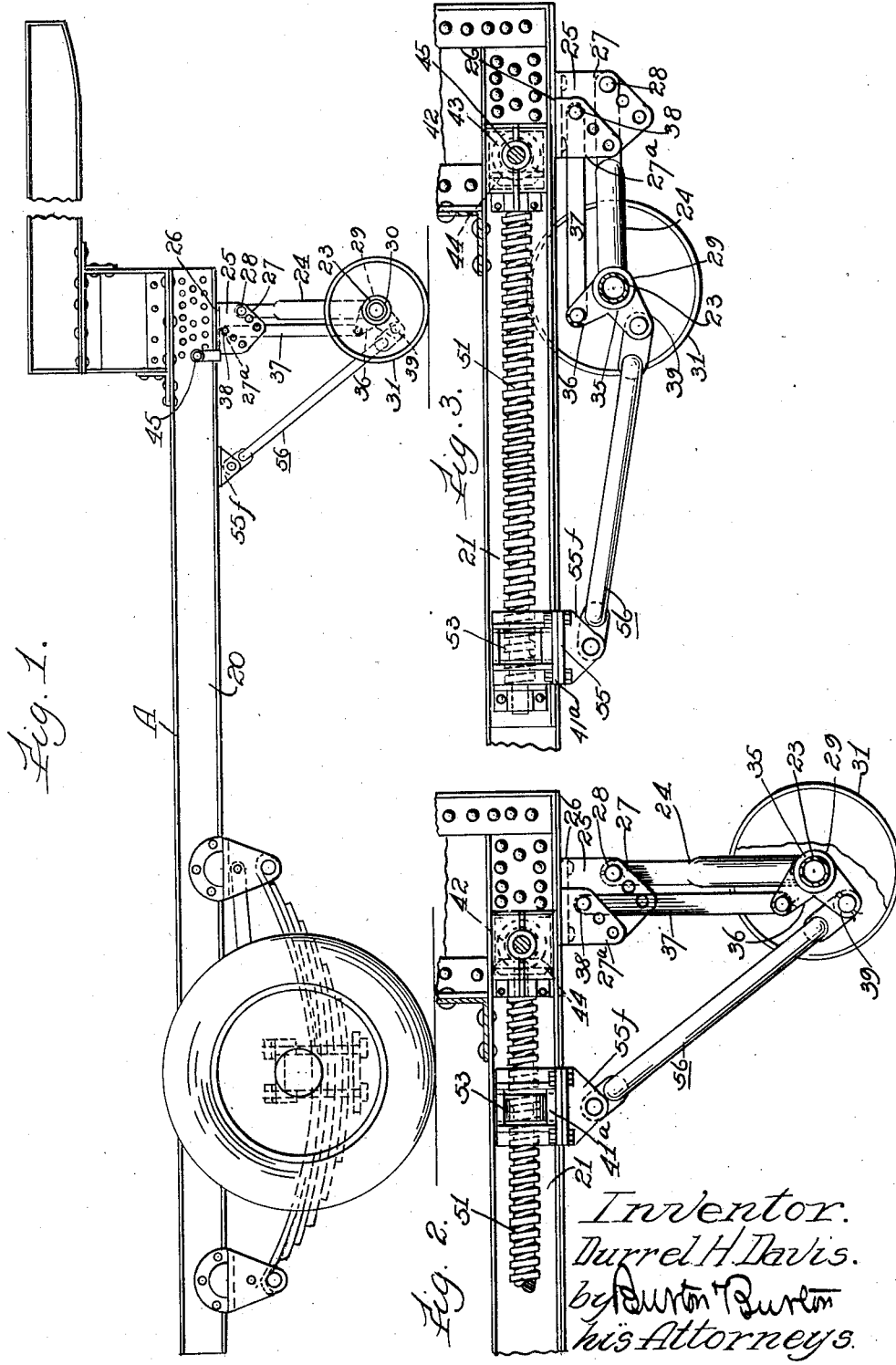

Patented Dec. 13, 1932

1,890,972

UNITED STATES PATENT OFFICE

DURREL H. DAVIS, OF EDGERTON, WISCONSIN, ASSIGNOR TO HIGHWAY TRAILER COMPANY, OF EDGERTON, WISCONSIN, A CORPORATION OF WISCONSIN

JACK FOR SEMITRAILERS

Application filed February 15, 1932. Serial No. 592,968.

The purpose of this invention is to provide an improved form of an appurtenance to a semi-trailer, commonly called a jack, being a support for the forward end of the trailer hinged to the under side of the trailer frame and having ground wheels at its free end arranged to be swung up against the under side of the trailer frame structure out of operative position when the trailer is lodged at its forward end on the tractor, or otherwise supported at that end.

The specific purpose of the invention is to adapt the jack to be easily and quickly operated for shifting it to and from operative-trailer-supporting position, and for affording a relatively high lift in order to insure substantial road clearance below the supporting wheels. The invention consists in the elements and features of construction shown and described as indicated in the claims.

In the drawings:

Figure 1 is a side elevation showing the forward end portion of a semi-trailer equipped with "jack" construction embodying this invention.

Figure 2 is a vertical longitudinal section of the part of the trailer frame at which the jack is attached, showing the jack in trailer-supporting position.

Figure 3 is a similar view showing the jack at retracted position.

Figure 4 is a detail plan view of the portion of the trailer frame on which the jack is mounted.

Figure 5 is a sectional view showing the jack in front elevation at operative position, the frame bars of the trailer being shown in transverse vertical section.

Figure 6 is a detail section at the line 6—6 on Figure 2.

The trailer frame indicated in general at A, is shown comprising longitudinal side bars, 20, 20, and a medial longitudinal bar, 21, all said bars being I-beams; the bed or floor of the trailer mounted on the I-beams is indicated at 22. The jack is shown consisting of what may be described as a leg element consisting of two legs, 24, 24, hingedly connected at their upper ends to the I-beams, 20, 20, by means of brackets, 25, 25, which are bolted to the under sides of the I-beams, as seen at 26. Continuing the description of these hinged legs with respect to either one of them, which are identical and identically connected with the remainder of the structure; the leg member, 24, is pivotally connected at its upper end as seen at 28, to the outer side depending flange, 27, of a channel-form bracket member, 25, and the two leg members are rigidly joined at their lower ends by a hollow transversely extending axle member, 23, the leg members being formed at their lower ends with hollow cross heads, 29, 29, through which said hollow axle, 23, extends, and with which it is made rigid for rigidly connecting the two leg members, 24, as a unitary structure. Loosely journaled on the opposite end portions of said transverse axle member, 23, beyond said cross-heads, 29, 29, are ground-engaging wheels, 31, 31 which are retained in place on the member, 23, by collars, 30, 30.

Pivotally mounted on the member, 28, inwardly from the legs, 24, 24, respectively, there are provided collars, 35, 35, each having a radially projecting arm, 36. To the arm, 36, of each collar there is pivotally connected, as indicated at 36ª, a control link, 37, extending parallel to the leg, 24, and pivotally connected at its upper end to the inner side flange, 27ª, of the bracket, 25, as seen at 38, said pivotal connection being shown at a higher point than the connection of the leg member, 24, to the outer flange, 27, of the bracket. The control link is shown substantially of the same length as the leg member from its hinge pivot at the upper end to the axis of the ground wheel axle which is the pivot axis of the lower end; so that when the control link is connected at its upper end at the point indicated on the bracket, and at its lower end to the arm, 36, of the collar, 35, said arm is held extending parallel to the plane of the axes of the upper end pivots of the leg, 24, and control link, 37.

In addition to the arm, 36, which forms what might be called the cross link connecting and spacing apart the parallel bar elements,—the leg and the control link,—each of the collars, 35, has another arm, 39, projecting at right angles to the arm, 36 for a purpose hereinafter explained.

For operating the jack for swinging it up from supporting position shown in Figure 2 to the position shown in Figure 3, there is mounted between the flanges of the I-beam, 21, on the right hand side thereof at the forward end, a gear box, 42, carrying a pair of intermeshing bevel gears, 43 and 44. The gear, 43, has an operating shaft, 45, extending out through the right hand frame member, 20, and furnished with a journal bearing in said frame member, as indicated at 46, and arranged at the end for receiving an operating crank shown at 48.

The companion bevel gear, 44, is fast on a screw shaft, 51, which extends forwardly in the channel of the I-beam, 21, in which there is mounted for sliding and being guided therein, an apertured and interiorly screw-threaded head block, 53, through which the screw shaft, 51, is screwed, so that the rotation of the screw shaft propels the head block along the I-beam, 21. The head block is attached slidingly to the I-beam, 21, by means of a bracket, 55, having an upper base flange, 55ª, channeled on its upper face by means of marginal upwardly projecting flanges, 55ᵇ, 55ᵇ, for fitting the base flange of the I-beam, 21. The head block has a foot flange, 41ª, lapping the marginal channel-forming and guide flange, 55ᵇ, at the outer side of the I-beam, 21, and bolted to the bracket, as seen at 55ᵈ, and at the opposite side there is provided a clamp plate, 41ᵇ, formed correspondingly to the foot flange, 41ª, and similarly lapping the inner flange of the base of the I-beam, and bolted to the marginal flange, 55ᵇ.

The bracket, 55, serving, as above indicated, for mounting and guiding the head block on the I-beam, affords by means of a downwardly projecting pair of lugs, 55ᵗ, connection for an operating link member, 56, which consists of two diverging arms, 58, 58, which are pivotally connected, respectively, at their lower ends to arms, 39, of the collars, 35.

Upon considering this construction it may be understood that when, the trailer being supported at the forward end,—as by being lodged on the tractor,—it is desired to retract the jack from load-supporting position, the operator rotating the screw shaft, 51, by means of the crank, 48, and bevel gears, 43 and 44, causes the head block, 53, to be propelled along the base flange of the I-beam, 21, and in that operation the operating link members, 56, swing the leg member rearwardly and upwardly about the pivot, 27, to the position shown in Figure 3. And upon considering this movement it will be recognized that the control links, 37, by means of what may be referred to as the bell crank lever connection consisting of the collar, 35, and its arms, 36 and 39, at right angles to each other, operates to retract the operating link a certain amount forwardly relatively to the ground wheel carrying end of the leg member, which operation is equivalent to swinging the leg member that amount rearwardly, and by that amount, reducing the distance necessary to drive the head block along the I-beam, 21, in order to swing the leg fully up to the position shown in Figure 3.

Upon considering the unit consisting of the collar, 35, and its two arms, 36 and 39, and the functioning of these arms, it may be recognized that the arm, 36, functions, as above mentioned, as a cross link of the parallel-bar ground-wheel-carrying structure; and that the arm, 39, functions as a lever arm of said cross link, the collar part of the unit being merely the pivoted end of the cross link. And accordingly, in the claims the arms, 36 and 39, are referred to respectively as "link means" and "lever means".

In Figure 6 there is shown a shield member, 60, for enclosing the screw shaft, 51, and head bock, 53, which, in the absence of said protection, would be liable to be clogged with dirt. This shield is of sheet metal bolted to the upper flange of the I-beam, 21, as clearly shown in Figure 6, and extends along the whole length of the screw shaft, as may be understood from Figure 4.

I claim:

1. In an apparatus comprising a horizontally extending frame structure to be supported, in combination with said frame structure, a leg element hinged at the upper end to the frame structure for depending therefrom in frame-supporting position, and carrying at its depending end a ground wheel axle; control linkage hinged at the upper end to the frame structure proximate to the leg hinge and depending normally substantially parallel to the depending leg; link means connecting the lower end of said control linkage with the lower end of the leg element at the ground wheel axle, said link means having lever means extending from the ground wheel axle axis transversely with respect to said link means; the frame structure having a longitudinally extending guideway proximate the level of the leg hinge; a head block mounted slidingly in said guideway; means for adjusting the head block along the guideway and holding it at adjusted position, and an operating link member connecting said lever means with the head block.

2. The construction defined in claim 1, comprising a pair of legs spaced apart transversely of the frame structure separately hinged to the frame structure and having rigid connection extending between their lower ends, the control linkage consisting of two separate links, the lower end link means consisting of two separate links pivotally mounted on said rigid connection and pivotally connected respectively with the lower ends of said separate control links, the lever means consisting of two lever arms extending respectively from the last mentioned two separate links.

3. The construction defined in claim 1, comprising a pair of legs spaced apart transversely of the frame structure separately hinged to the frame structure and having rigid connection extending between their lower ends, the control linkage consisting of two separate links, the lower end link means consisting of two separate links pivotally mounted on said rigid connection and pivotally connected respectively with the lower ends of said separate control links, the lever means consisting of two lever arms extending respectively from the last mentioned two separate links, the longitudinally extending guideway of the frame structure being at a vertical plane intermediate the vertical planes in which the two legs depend, and the operating link member comprising divergent brace arms joined at their upper ends to the head block and at their lower ends respectively to the lever arms of the separate links.

4. The construction defined in claim 1, the lever arm of the link means being approximately at right angles to the linking portion of said link means, and the control linkage being dimensioned and arranged with relation to the leg element to hold the lever means of the link means at an angle of approximately 45 degrees to the vertical position of the leg.

5. The construction defined in claim 1 having the several parts dimensioned for positioning the operating link member substantially at right angles to the lever means of the link means when the leg is in upright position for supporting the frame structure.

6. A trailer structure comprising in combination with a horizontally extending frame, a pair of transversely spaced leg elements hingedly connected at their upper ends to said frame and adapted to depend therefrom in frame supporting position, and carrying at their depending ends a ground wheel axle; control links hinged at their upper ends to the frame structure proximate to the leg hinges and depending normally substantially parallel to said depending legs; the hinge connection of said links being rearwardly of and above the hinge connection of the legs to permit said legs and links to be swung in substantially parallel relation through a range of movement of approximately 45 degrees; link means connecting the lower end of said control links with the lower ends of the leg elements at the ground wheel axle, said link means having lever means extending from the ground wheel axle axis transversely with respect to said link means; the frame structure having a longitudinally extending guideway proximate the level of the leg hinge; a head block mounted slidably in said guideway; means for adjusting the head block along the guideway and holding it at adjusted position, and an operating link member connecting said lever means with the head block.

7. A trailer structure comprising in combination with a horizontally extending frame, a pair of transversely spaced supporting brackets secured to said frame adjacent the forward end, a pair of spaced apart leg elements hingedly connected at their upper ends to the brackets and adapted to depend in upright frame supporting position, the lower ends of said legs carrying a ground wheel axle, a control link for each of said legs hingedly connected at its upper end to said bracket rearwardly of and above the said hinge connection of the leg for permitting the respective legs and links to normally depend in substantially parallel relation and adapted to be swung in substantially parallel relation throughout a range of movement of approximately 45 degrees; each of said brackets having two rows of a plurality of spaced apart pivot connections for said legs and links, arranged in parallel relation for permitting variation of the effective lengths of said legs; link means connecting the lower end of said control links with the lower ends of the leg elements at the ground wheel axle, said link means having lever means extending from the ground wheel axle axis transversely with respect to said link means; the frame structure having a longitudinally extending guideway proximate the level of the leg hinge; a head block mounted slidably in said guideway; means for adjusting the head block along the guideway and holding it at adjusted position, and an operating link member connecting said lever means with the head block.

8. In an apparatus comprising a horizontally extending frame structure to be supported, in combination with said frame structure, a leg element hinged at the upper end to the frame structure for depending therefrom in frame-supporting position, and carrying at its depending end a ground wheel axle; control linkage hinged at the upper end to the frame structure proximate to the leg hinge and depending normally substantially parallel to the depending leg; link means connecting the lower end of said control linkage with the lower end of the leg element at the ground wheel axle, said link means having lever means extending from the ground wheel axle axis transversely with respect to said link means; the frame structure having a longitudinally extending guideway proximate the level of the leg hinge; a head block mounted slidingly in said guideway; means for adjusting the head block along the guideway and holding it at adjusted position, said means including a longitudinally extending screw operatively associated with the head block, and gearing for rotating said screw; an operating link member connecting said lever means with the head block, and a protecting shield connected to the frame structure and arranged for enclosing said operating screw.

In testimony whereof, I have hereunto set my hand at Edgerton, Wisconsin, this 11th day of February, 1932.

DURREL H. DAVIS.